United States Patent
Takahashi et al.

(10) Patent No.: US 12,031,943 B2
(45) Date of Patent: Jul. 9, 2024

(54) ION ANALYZER

(71) Applicants: Shimadzu Corporation, Kyoto (JP); National Institute of Advanced Industrial Science and Technology, Tokyo (JP)

(72) Inventors: Hidenori Takahashi, Kyoto (JP); Daiki Asakawa, Tsukuba (JP)

(73) Assignees: SHIMADZU CORPORATION, Kyoto (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 367 days.

(21) Appl. No.: 17/626,535

(22) PCT Filed: Jul. 19, 2019

(86) PCT No.: PCT/JP2019/028418
§ 371 (c)(1),
(2) Date: Jan. 12, 2022

(87) PCT Pub. No.: WO2021/014487
PCT Pub. Date: Jan. 28, 2021

(65) Prior Publication Data
US 2022/0260527 A1     Aug. 18, 2022

(51) Int. Cl.
*G01N 27/62*     (2021.01)
*H01J 49/00*     (2006.01)
(Continued)

(52) U.S. Cl.
CPC .......... *G01N 27/62* (2013.01); *H01J 49/0036* (2013.01); *H01J 49/0068* (2013.01);
(Continued)

(58) Field of Classification Search
CPC .. G01N 27/62; H01J 49/0036; H01J 49/0068; H01J 49/025; H01J 49/424; H01J 49/164; H01J 49/24; H01J 49/40; H01J 49/0072
(Continued)

(56) References Cited

U.S. PATENT DOCUMENTS

| 11,908,671 B2* | 2/2024 | Takahashi ........... H01J 49/0077 |
| 2016/0372311 A1 | 12/2016 | Takahashi et al. |
| 2020/0111654 A1 | 4/2020 | Takahashi et al. |

FOREIGN PATENT DOCUMENTS

| WO | 2015/133259 A1 | 9/2015 |
| WO | 2018/186286 A1 | 10/2018 |

OTHER PUBLICATIONS

Yuji Shimabukuro et al., "Tandem Mass Spectrometry of Peptide Ions by Microwave Excited Hydrogen and Water Plasmas", Analytical Chemistry, May 24, 2018, pp. 7239-7245, vol. 90.
(Continued)

*Primary Examiner* — Michael Maskell
(74) *Attorney, Agent, or Firm* — Sughrue Mion, PLLC (57) ABSTRACT

An ion analyzer for analyzing product ions generated by irradiating precursor ions derived from a sample component with radicals, the ion analyzer including a reaction chamber 2, a radical supply unit 5, 6 configured to generate radicals and supply the radicals to the reaction chamber, a radical temperature acquisition unit 911, 912 configured to acquire a temperature of the radicals to be supplied to the reaction chamber, a standard substance supply unit 11 configured to supply a predetermined amount of predetermined precursor ions to the reaction chamber, the predetermined precursor ions being generated from a standard substance whose activation energy of a reaction in which the radicals attach to the standard substance is known, an ion measurement unit 92 configured to measure an amount of predetermined product ions generated from the precursor ions derived from
(Continued)

the standard substance by the reaction with the radicals, a reactive radical amount calculation unit 93 configured to obtain an amount of reactive radicals based on the amount of the predetermined product ions, and a radical density calculation unit 94 configured to obtain a radical density based on the temperature of the radicals, the activation energy, and the amount of the reactive radicals.

8 Claims, 5 Drawing Sheets (51) Int. Cl.
    *H01J 49/02*     (2006.01)
    *H01J 49/42*     (2006.01)
    *H01J 49/16*     (2006.01)
    *H01J 49/24*     (2006.01)
    *H01J 49/40*     (2006.01)

(52) U.S. Cl.
    CPC .......... *H01J 49/025* (2013.01); *H01J 49/424* (2013.01); *H01J 49/164* (2013.01); *H01J 49/24* (2013.01); *H01J 49/40* (2013.01)

(58) Field of Classification Search
    USPC ................................................. 250/281, 282
    See application file for complete search history.

(56) References Cited

OTHER PUBLICATIONS

Hidenori Takahashi et al., "Hydrogen Attachment/Abstraction Dissociation (HAD) of Gas-Phase Peptide Ions for Tandem Mass Spectrometry", Analytical Chemistry, Mar. 22, 2016, pp. 3810-3816, vol. 88.
International Search Report for PCT/JP2019/028418 dated, Oct. 8, 2019 (PCT/ISA/210).
Written Opinion of the International Searching Authority for PCT/JP2019/028418 dated Oct. 8, 2019 (PCT/ISA/237).
Office Action issued in Aug. 30, 2022 in Japanese Application 2021-534848.

* cited by examiner

ION ANALYZER

CROSS REFERENCE TO RELATED APPLICATIONS

This application is a National Stage of International Application No. PCT/JP2019/028418 filed Jul. 19, 2019.

TECHNICAL FIELD

The present invention relates to an ion analyzer that irradiates ions derived from a sample component with radicals for analysis.

BACKGROUND ART

In order to identify a high polymer compound or analyze a structure of a high polymer compound, a type of mass spectrometry is widely used in which ions derived from a high polymer compound (precursor ions) are dissociated one or more times to generate product ions (also referred to as fragment ions), and the product ions are separated according to mass-to-charge ratio and detected. As a representative method for dissociating ions in such mass spectrometry, the collision-induced dissociation (CID) method in which molecules of an inert gas such as nitrogen gas are made to collide with ions is known. The CID method, in which ions are dissociated by the collision energy with inert molecules, can cause dissociation of various ions. However, the CID method has poor capability in selecting the position where ions are dissociated. Therefore, the CID method is unsuitable for a case where ions are to be dissociated at a specific site for structural analysis. For example, when analyzing a peptide or the like, it is desirable to specifically dissociate the peptide at a position where amino acids are linked, but such dissociation is difficult when using the CII) method.

As an ion dissociation method for specifically dissociating a peptide at a position where amino acids are linked, the electron transfer dissociation (ETD) method in which precursor ions are made to collide with negative ions and the electron capture dissociation (ECD) method in which precursor ions are irradiated with electrons have been conventionally used. These methods are referred to as unpaired electron-induced dissociation method in which N—Cα bonds of peptide main chains are dissociated to generate product ions of c/z-type.

The ETD method and the LCD method, which generate product ions by causing negative ions or electrons to collide with positive precursor ions, can target only divalent or higher positive precursor ions. Ions generated by a soft ionization method such as the matrix-assisted laser desorption/ionization (MALDI) method used for ionization of proteins and peptides are mostly monovalent ions. Accordingly, the ETD method and the ECD method do not make a good combination with the MALDI method or the like that generates mostly monovalent positive ions.

One of the inventors has proposed hydrogen-attached dissociation (HAD) method in which unpaired electron-induced dissociation is caused by irradiating precursor ions derived from a peptide with hydrogen radicals (Patent Literature 1 and Non Patent Literature 1). The HAD method is suitable for combination with a soft ionization method such as the MALDI method because the valence of precursor ions does not change by dissociation. Also by the HAD method, product ions of c/z-type can be generated.

One of the inventors has also proposed dissociating precursor ions derived from a peptide specifically at positions where amino acids are linked using hydroxyl radicals, oxygen radicals, or nitrogen radicals (Patent Literature 2). When the precursor ions derived from a peptide are irradiated with such radicals, product ions of a/x-type and/or product ions of b/y-type are generated.

CITATION LIST

Patent Literature

Patent Literature 1: WO 2015/133259 A
Patent Literature 2: WO 2018/186286 A

Non Patent Literature

Non Patent Literature 1: Yuji Shimabukuro, Hidenori Takahashi, Shinichi Iwamoto, Koichi Tanaka, Motoi Wada, "Tandem Mass Spectrometry of Peptide Ions by Microwave Excited Hydrogen and Water Plasmas", Anal. Chem. 2018, 90 (12) pp 7239-7245

Non Patent Literature 2: Hidenori Takahashi, Sadanori Sekiya, Takashi Nishikaze, Kei Kodera, Shinichi Iwamoto, Motoi Wada, Koichi Tanaka, "Hydrogen Attachment/Abstraction Dissociation (HAD) of Gas-Phase Peptide Ions for Tandem Mass Spectrometry.", Anal. Chem. 2016, 88 (7), pp 3810-3816

SUMMARY OF INVENTION

Technical Problem

In confirming (identifying) that a measured sample component is a target peptide, the product ion spectrum acquired for the sample component is compared with the product ion spectrum of the peptide previously stored in a library.

However, when the density (space density=the number of radicals per unit volume) of the radicals with which the precursor ions are irradiated at the time of acquiring the product ion spectrum stored in the library is different from the density of the radicals irradiated to the precursor ions at the time of measuring the component (actual sample component) contained in the actual sample, the attached amount of the radicals to the precursor ions is different, and there is a case where different product ions are generated due to different degrees or modes of dissociation. Then, the position and intensity of the mass peak of the product ion spectrum obtained by the measurement of the actual sample component are different from the position and intensity of the mass peak of the product ion spectrum stored in the library even though the peptides are the same, and the peptide cannot be identified.

Such a problem can be solved by checking in advance the radicals of what density were irradiated to the precursor ions to obtain the product ion spectrum registered in the library, and irradiating the precursor ions with radicals of the same density at the time of measuring the actual sample component. However, conventionally, there is no index related to the density of radicals irradiated to the precursor ions derived from the sample component, and there is a problem that it is necessary to search for the conditions under which the precursor ions are irradiated with radicals having an appropriate density while variously changing the radical irradiation conditions.

Here, the mass spectrometer that separates and measures product ions according to the mass-to-charge ratio has been described as an example, but an ion analyzer such as an ion mobility analyzer that separates and measures product ions according to the ion mobility also has the same problem as described above.

The problem to be solved by the present invention is to provide an index related to the density of radicals with which precursor ions are irradiated in an ion analyzer that irradiates and analyzes precursor ions derived from a sample component with radicals.

Solution to Problem

The present invention completed in order to solve the above problem is an ion analyzer for analyzing product ions generated by irradiating precursor ions derived from a sample component with radicals, the ion analyzer including:
- a reaction chamber;
- a radical supply unit configured to generate the radicals and supply the radicals to the reaction chamber;
- a radical temperature acquisition unit configured to acquire a temperature of the radicals to be supplied to the reaction chamber from the radical supply unit;
- a standard substance supply unit configured to supply a predetermined amount of predetermined precursor ions to the reaction chamber, the predetermined precursor ions being generated from a standard substance whose activation energy of a reaction in which the radicals attach to the standard substance is known;
- an ion measurement unit configured to measure an amount of predetermined product ions generated from the precursor ions derived from the standard substance by the reaction with the radicals;
- a reactive radical amount calculation unit configured to obtain, based on the amount of the predetermined product ions measured, an amount of reactive radicals that are radicals having an energy equal to or more than the activation energy among the radicals supplied to the reaction chamber; and
- a radical density calculation unit configured to obtain a radical density based on the temperature of the radicals, the activation energy, and the amount of the reactive radicals.

Advantageous Effects of Invention

The ion analyzer according to the present invention is used, for example, to determine a radical density as one of measurement conditions when performing measurement using a standard substance in order to acquire a product ion spectrum to be registered in a library. In addition, for example, when an unknown sample containing a target component registered in a library is analyzed, the ion analyzer is also used to determine the density of radicals irradiated to the unknown sample in order to reproduce the radical density registered in the library.

In the ion analyzer according to the present invention, first, a predetermined amount of predetermined precursor ions generated from a standard substance whose activation energy of radical attachment reaction is known is supplied to a reaction chamber. Then, a predetermined kind of radicals (target radicals) that are a target for determining the density using the analyzer is introduced into the reaction chamber. At this time, a radical temperature acquisition unit determines the temperature of the radicals to be introduced into the reaction chamber. A method of obtaining this temperature will be described later. In the reaction chamber, the predetermined precursor ions react with the target radicals to generate product ions. Then, the amount of predetermined product ions in the product ions thus generated is measured. The "predetermined product ion" is typically an ion to which the target radical is attached (radical attached ion), but may be a fragment ion when dissociation of the predetermined precursor ions occurs due to attachment of the target radical. The amount of predetermined product ions thus measured reflects the amount of radicals (reactive radicals) having an energy equal to or higher than the activation energy among the target radicals introduced into the reaction chamber. The energy of the radical is distributed depending on the temperature of the radical. Therefore, in the present invention, the amount of the target radical with which the predetermined precursor ions are irradiated is obtained based on the amount of the reactive radicals and the radical temperature obtained as described above. In addition, the volume of the space in which the predetermined precursor ions and the target radicals react is obtained based on the shape of the reaction chamber or the like. The radical density can be calculated from the amount of the target radicals thus obtained and the volume of the radical irradiation space.

By making it possible to calculate the radical density supplied from the radical supply unit to the reaction chamber in this manner, for example, radical irradiation conditions at the time of creating a product ion spectrum stored in a library can be clarified. That is, the predetermined precursor ions generated from the standard substance is introduced into the reaction chamber, and a target radical is supplied from the radical supply unit to the reaction chamber in the same manner to obtain the density of the radicals at the time of acquiring the product ion spectrum of the standard substance, and the density is stored in the library together with the product ion spectrum. When an unknown sample is analyzed, the unknown sample is placed in the same reaction chamber, a target radical is supplied there from the radical supply unit in the same manner to generate product ions derived from a sample component to be analyzed, and the product ion spectrum is measured. As a result, the product ion spectrum measured for the sample component and the product ion spectrum stored in the library are generated by the radicals under the same conditions (density), and both can be correctly compared, and the sample component can be correctly identified.

DESCRIPTION OF EMBODIMENTS

Specific embodiments of an ion analyzer according to the present invention will be described below with reference to the drawings. Each of the ion analyzers of the first embodiment and the second embodiment described below is an ion trap-time-of-flight (IT-TOF) mass spectrometer (hereinafter, also simply referred to as "mass spectrometer").

First Embodiment

Figure 1:
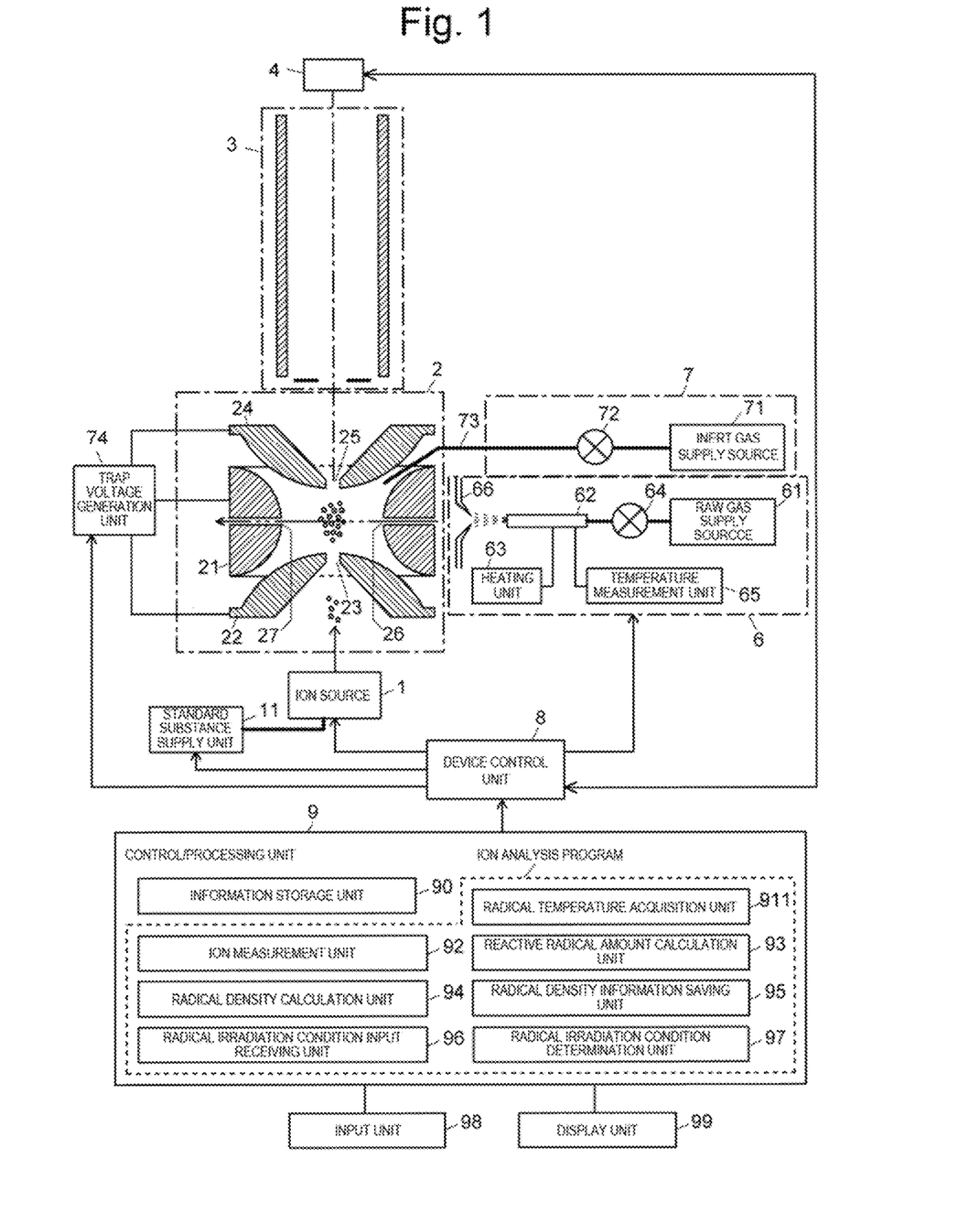
FIG. 1 is a schematic configuration diagram of an ion trap-time-of-flight mass spectrometer of a first embodiment that is an embodiment of an ion analyzer according to the present invention.

FIG. 1 illustrates a schematic configuration of the mass spectrometer of the first embodiment. The mass spectrometer of the first embodiment includes, an ion source 1 that ionizes a component in a sample, an ion trap 2 that traps ions generated by the ion source 1 by the action of a radio-frequency electric field, a time-of-flight mass separation unit 3 that separates ions ejected from the ion trap 2 according to mass-to-charge ratio, and an ion detector 4 that detects the separated ions. These are accommodated in a vacuum chamber (not illustrated) maintained in which vacuum atmosphere is maintained. The mass spectrometer of the embodiment further includes a radical supply unit 6 configured to supply radicals into the ion trap 2 for irradiating precursor ions trapped in the ion trap 2 with radicals, an inert gas supply unit 7 configured to supply a predetermined inert gas into the ion trap 2, a trap voltage generation unit 74, a device control unit 8, and a control/processing unit 9. The device control unit 8 controls operations of the units of the mass spectrometer based on a control signal transmitted from the control/processing unit 9.

A standard substance supply unit 11 is connected to the ion source 1. The standard substance supply unit 11 individually supplies one or a plurality of kinds of standard substances to the ion source 1 under the control of the device control unit 8. The standard substances will be described later.

The ion trap 2 is a three-dimensional ion trap including an annular ring electrode 21 and a pair of end cap electrodes (an inlet-side end cap electrode 22 and an outlet-side end cap electrode 24) disposed to oppose each other with the ring electrode 21 between them. A radical introduction port 26 and a radical discharge port 27 are formed in the ring electrode 21. An ion introduction hole 23 is formed in the inlet-side end cap electrode 22. An ion ejection hole 25 is formed in the outlet-side end cap electrode 24. Under the control of the device control unit 8, the trap voltage generation unit 74 applies one of a radio-frequency voltage, a direct-current voltage, or a combined voltage of the radio-frequency voltage and the direct-current voltage to each of the ring electrode 21, the inlet-side end cap electrode 22, and the outlet-side end cap electrode 24 at a predetermined timing. Thus, precursor ions having a specific mass-to-charge ratio are selectively trapped in the ion trap 2.

The radical supply unit 6 includes a raw gas supply source 61 configured to supply a raw gas of radicals, a capillary 62 into which the raw gas is introduced, a heating unit 63 for heating the capillary 62, and a valve 64 for adjusting the flow rate of the raw gas to be introduced into the capillary 62. The radical supply unit 6 in the first embodiment generates radicals by causing the raw gas to thermally dissociate in the capillary 62 that is heated (see Patent Literature 1 and Non Patent Literature 2). That is, the capillary 62 corresponds to a thermal dissociation unit in the present invention. As the capillary 62, a material having a high melting point or hardness can be suitably used. One such material is tungsten. The radical supply unit 6 also includes a temperature measurement unit 65 for measuring the temperature of the capillary 62. For example, an infrared radiometer is used as the temperature measurement unit 65. When the raw gas is thermally dissociated in the capillary 62 to generate radicals as in the embodiment, the generated radicals and the capillary 62 are considered to be in a thermal equilibrium state. Therefore, it is possible to estimate the radical temperature by measuring the temperature of the capillary 62. A skimmer 66 for forming a gas flow released from the capillary 62 into a radical flow having a small diameter is disposed between an outlet of the capillary 62 and the ion introduction hole 23.

The inert gas supply unit 7 includes an inert gas supply source 71 storing the inert gas used as buffer gas or cooling gas, a valve 72 for adjusting the flow rate of the inert gas, and a gas inlet pipe 73. As the inert gas, for example, helium gas, nitrogen gas, or argon is used.

In addition to an information storage unit 90, the control/processing unit 9 includes a radical temperature acquisition unit 911, an ion measurement unit 92, a reactive radical amount calculation unit 93, a radical density calculation unit 94, a radical density information saving unit 95, a radical irradiation condition input receiving unit 96, and a radical irradiation condition determination unit 97 as functional blocks. The control/processing unit 9 is actually a personal computer, and the above-described functional blocks are embodied by executing an ion analysis program previously installed in the computer. An input unit 98 and a display unit 99 are connected to the control/processing unit 9.

First Analysis Example

An example of obtaining a radical density using the mass spectrometer of the first embodiment will now be described. In this example, after a useful measurement result is obtained under a certain radical irradiation condition for a certain sample to be analyzed, one kind of standard substance whose magnitude of the activation energy of the radical attachment reaction is known is measured using the irradiation condition as it is.

When a user gives instruction to start measuring the radical density, the radical irradiation condition input receiving unit 96 displays on the display unit 99 a screen for inputting a radical irradiation condition to prompt the user to input the radical irradiation condition. Here, the radical irradiation condition including the kind and flow rate of raw gas supplied from the raw gas supply source 61 and a radical irradiation time is input.

When the radical irradiation condition is input, the ion measurement unit 92 controls the operation of each unit through the device control unit 8, and performs the following measurement operation using the radical irradiation condition which has been input. First, a vacuum pump (not illustrated) evacuates the inside of the vacuum chamber. The heating unit 63 heats the capillary 62.

Subsequently, a standard substance is supplied from the standard substance supply unit 11 to the ion source 1, and the standard substance generates ions. In many cases, mainly monovalent molecular ions are generated. The ions generated in this manner is ejected from the ion source 1 in the form of a packet, and the ions pass through the ion introduction holes 23 formed in the inlet-side end cap electrode 22 and are introduced inside of the ion trap 2.

In parallel with or prior to ion generation in the ion source 1, a predetermined radio-frequency voltage (and a direct-current voltage) is applied from the trap voltage generation unit 74 to each of the ring electrode 21, the inlet-side end cap electrode 22, and the outlet-side end cap electrode 24.

The ions introduced into the ion trap 2 are trapped by a radio-frequency electric field formed in the ion trap 2. Then, a predetermined radio-frequency voltage (and a direct-current voltage) is applied from the trap voltage generation unit 74 to the ring electrode 21 and the like to excite ions having a mass-to-charge ratio other than a specific mass-to-charge ratio of the target ions, and release the excited ions from the ion trap 2. Thus, the precursor ions having the specific mass-to-charge ratio are selectively trapped in the ion trap 2.

After the predetermined precursor ions are trapped in the ion trap 2, the valve 72 of the inert gas supply unit 7 is opened to introduce the inert gas into the ion trap 2. As a result of the introduction of the inert gas, the precursor ions are cooled and converged to the vicinity of the center of the ion trap 2.

Thereafter, the valve 64 of the radical supply unit 6 is opened, and a predetermined kind of raw gas is supplied from the raw gas supply source 61 to the capillary 62. Then, the raw gas is thermally dissociated while passing through the capillary 62 to generate a predetermined kind of radicals. The generated radicals pass through an opening of the skimmer 66 to form a beam having a small diameter, and are supplied from the radical introduction port 26 into the ion trap 2, in this way, the precursor ions trapped in the ion trap 2 are irradiated with the radicals. In addition, while the raw gas is supplied to the capillary 62 by opening the valve 64 to generate radicals, the radical temperature acquisition unit 911 acquires the radical temperature by measuring the temperature of the capillary 62 with the temperature measurement unit 65.

The opening degree of the valve 64 is maintained in a constant state for the radical irradiation time input by the user. Meanwhile, predetermined precursor ions derived from the standard substance trapped in the ion trap 2 are irradiated with radicals, and a radical attachment reaction occurs in the precursor ions to generate product ions. The product ions generated from the precursor ions by the radical attachment reaction are roughly classified into radical adduct ions obtained by attachment of radicals to the precursor ions and fragment ions generated by dissociation of the precursor ions after the radicals are attached to the precursor ions. The product ions generated by the radical attachment reaction are trapped in the ion trap 2 and cooled by the inert gas supplied from the inert gas supply unit 7. Thereafter, a high DC voltage is applied from the trap voltage generation unit 74 to the inlet-side end cap electrode 22 and the outlet-side end cap electrode 24 at a predetermined timing. As a result, a constant acceleration energy is applied to the product ions trapped in the ion trap 2, and the product ions are simultaneously ejected from the ion ejection hole 25.

The ions having a constant acceleration energy are introduced into a flight space of the time-of-flight mass separation unit 3, and are separated according to mass-to-charge ratio while flying in the flight space. The ion detector 4 sequentially detects the separated ions and transmits a detection signal to the control/processing unit 9. The control/processing unit 9 saves the received detection signal in the information storage unit 90.

The reactive radical amount calculation unit 93 creates a time-of-flight spectrum in which the time point at which the product ions are ejected from the ion trap 2 is time 0. Then, the time-of-flight is converted into the mass-to-charge ratio by using mass conversion information prepared in advance and associating the time-of-flight with the mass-to-charge ratio of the ions. As a result, a product ion spectrum is created from the time-of-flight spectrum. The reactive radical amount calculation unit 93 also obtains the amount of predetermined product ions (radical adduct ions or fragment ions) generated by the radical attachment reaction from the product ion spectrum of the standard substance. The amount of product ions reflects the amount of radicals (reactive radicals) that have caused radical attachment reaction in the precursor ions. This radicals are radicals having energy equal to or higher than the activation energy of the radical attachment reaction of the standard substance among the radicals generated by the radical supply unit 6.

When the amount of the predetermined product ions derived from the standard substance is obtained by the reactive radical amount calculation unit 93, the radical density calculation unit 94 obtains the radical density of the radicals with which the precursor ions derived from the standard substance are irradiated, based on the radical temperature acquired by the radical temperature acquisition unit 911, the magnitude of activation energy of the radical attachment reaction to the standard substance, and the amount of the reactive radicals. The method for obtaining the radical density will be described in detail later.

When the radical density is obtained by the radical density calculation unit 94, the radical density information saving unit 95 saves, in the information storage unit 90, radical density information in which the radical irradiation condition input by the user is associated with the radical density obtained for the radical irradiation condition. By repeating such a series of measurement and the like, information in which a plurality of different radical irradiation conditions and radical densities are associated with each other is accumulated in the information storage unit 90, and a radical density information database is created.

Next, calculation of the radical density by the radical density calculation unit 94 will be described.

The radical temperature is defined as T, and the activation energy of the radical attachment reaction of the precursor ions of the standard substance X (energy threshold at which the radical attachment reaction occurs) is defined as $E_x$. The radicals attached to the precursor ions derived from the standard substance X are only radicals having energy exceeding the energy threshold value $E_x$. The energy of the radicals is expressed by $\frac{1}{2} \times mv^2$. Here, m is the mass of the radicals, and v is the flight speed of the radicals. A ratio F of the radicals having an energy exceeding the energy threshold $E_X$ among all the radicals with which the standard substance X is irradiated is expressed by the following first formula.

[First formula]

$$F(E_x, T) = \int_{\sqrt{\frac{2E_X}{m}}}^{\infty} f(v, T) dv \qquad (1)$$

Here, f(v, T) is a Maxwell distribution with respect to the radical temperature T. The Maxwell distribution is expressed by the following second formula.

[Second formula]

$$f(v, T) = 4\pi v^2 \left(\frac{m}{2\pi kT}\right)^{3/2} \exp\left(-\frac{mv^2}{2kT}\right) \quad (2)$$

Therefore, when the radical density (the number of radicals per unit volume) is $N_R$, the number of radical attachment (the amount of reactive radicals) $R_X$ per unit time (one second) is represented by the following third formula.

[Third formula]

$$R_X \propto N_R F(E_X, T) = N_R \int_{\sqrt{\frac{2E_X}{m}}}^{\infty} f(v, T) dv \quad (3)$$

From the above formula, the radical density $N_R$ is represented by the following fourth formula.

[Fourth formula]

$$N_R \propto \frac{R_X}{F(E_x, T)} \quad (4)$$

In the mass spectrometer of the first embodiment, the radical temperature T can be estimated from the temperature of the capillary 62 measured by the temperature measurement unit 65. An approximate solution of $F(E_X, T)$ can easily be calculated by a numerical solution method similarly to an error function of which numerical solution is widely known. Therefore, it is possible to obtain the relative value (any unit) of the radical density from the measured value of the mass peak of the predetermined product ions reflecting the radical attachment number $R_X$.

It is also possible to obtain the absolute value (number/m³) of the radical density by obtaining the relationship between the measured value of the mass peak of the predetermined product ions and the real number of the reactive radicals by preliminary experiments or simulations, and obtaining the volume of the space where the precursor ions are converged in the ion trap 2 by performing simulations based on the shape of the ion trap 2 and the voltage to apply. However, in the case of the same type of mass spectrometer, since the same ion detector is used, the relationship between the measured value of the mass peak and the real number of the reactive radical is the same. The volume of the space where the precursor ions are trapped in the ion trap 2 is also considered to be practically the same. Therefore, when the mass spectrometer of the same type is used, the relative value may be used as it is as an index of the radical density.

Figure 2:
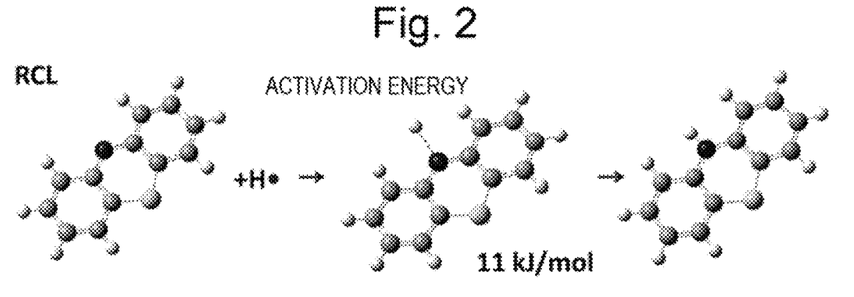
FIG. 2 is a view for explaining a radical attachment reaction of RCL as a standard substance in a first analysis example.

Next, an example in which the relative value of the radical density is actually obtained by the above procedure will be described. In this example, RCL (phenothiazine-5-ium) was used as the standard substance, and monovalent molecular ions derived from RCL were used as the predetermined precursor ions to be irradiated with hydrogen radicals. As shown in FIG. 2, the activation energy for the attachment reaction of hydrogen radicals to RCL is 11 kJ/mol. In addition, hydrogen adduct ions (predetermined product ions) are generated by attachment of radicals to molecular ions. In this measurement, the hydrogen radical irradiation time (HAD reaction time) was 100 ms, and the hydrogen gas flow rate was 2 sccm. The product ions were measured under a plurality of radical irradiation conditions having different electric current values to be supplied to the filament of the heating unit 63 for heating the capillary 62. It is not essential for the present invention to set a plurality of radical irradiation conditions, and the radical density can be determined by using only one radical irradiation condition.

Figure 3:
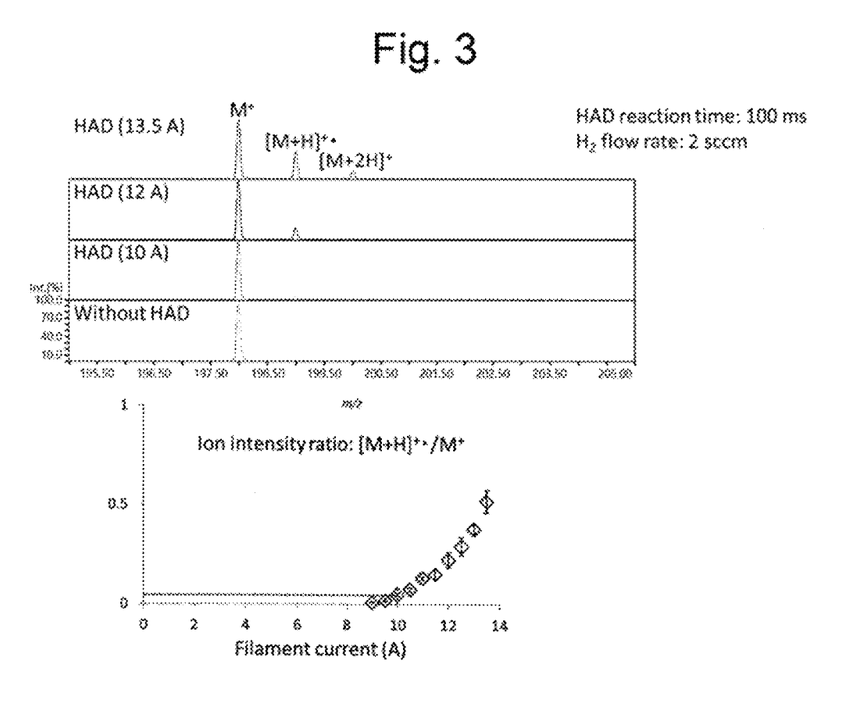
FIG. 3 is a view for explaining a result of irradiating RCL with hydrogen radicals generated under a plurality of radical irradiation conditions in the first analysis example.

FIG. 3 shows the measurement results. The calculation of the radical density will be described based on the measurement result of the product ions when an electric current of 13.5 A was supplied to the filament. The temperature of the capillary 62 when an electric current of 13.5 A was supplied to the filament (that is, the estimated temperature of hydrogen radicals) was 2300 K. As described above, since the activation energy of the hydrogen radical attachment reaction of RCL to molecular ions is 11 kJ/mol, the value of the first formula is F=0.76. Further, as shown in the lower diagram of FIG. 3, since hydrogen is attached to 30% of precursor ions in 0.1 s (hydrogen radical irradiation time), $R_X$=3, and the relative value of the radical density is 4. Therefore, the radical irradiation condition and the relative value $R_X$=4 may be saved in the information storage unit 90 in association with each other.

For example, when a product ion spectrum obtained by measuring a standard sample under a certain radical irradiation condition is saved in a spectrum library or the like, an index value of radical density is obtained by measuring the standard substance such as RCL under the same radical irradiation condition, and the index value and the radical irradiation time are saved together. When an unknown sample is measured as well, the standard substance such as RCL is measured under an appropriate radical irradiation condition to determine an index value of radical density. Then, the radical irradiation condition and/or the radical irradiation time are adjusted so that the product of the index value of the radical density of the actual sample and the radical irradiation time (that is, the time of the radical attachment reaction) becomes the same as the product recorded in the library. As a result, it is possible to irradiate the precursor ions with the same amount of radicals as when the product ion spectrum registered in the library is acquired, and to analyze an unknown sample with high reproducibility.

At the time of measuring an unknown sample, it is more preferable to irradiate the precursor ions with radicals having the same density as the density at the time of acquiring the product ion spectrum recorded in the library for the same time. Therefore, next, an example will be described in which the radical irradiation condition is determined so as to have the index value of the radical density designated by the user in the mass spectrometer of the first embodiment. This example is also used when an unknown sample is measured. Here, by measuring the standard substance under different radical irradiation conditions, a radical density information database in which the radical irradiation conditions and the index value of the radical density are associated with each other is created in advance and saved in the information storage unit 90. The radical density information database is saved in an appropriate form such as a table form or a mathematical expression.

When a user gives instruction to search for the radical density conditions, the radical irradiation condition input receiving unit 96 displays on the display unit 99 a screen for allowing the user to input an index value of radical density and irradiation time.

When an index value of radical density and irradiation time are input by the user, the radical irradiation condition determination unit 97 refers to the radical density information database saved in the information storage unit 90, and determines the radical irradiation condition for performing irradiation with radicals having the input index value of radical density. Specifically, the unit determines whether or not information on the index value of radical density input by the user is saved in the radical density information database, and if the information is saved (or can be calculated from a mathematical formula or the like), determines the radical irradiation condition and the radical irradiation time input by the user as the radical irradiation condition.

When the index value of radical density is saved as a discrete value, for example, when the radical density information database is in a table format or the like, the radical irradiation condition that matches the index value of radical density itself input by the user may not be saved. In this case, the index value of radical density closest to the index value of radical density input by the user is read, and the radical irradiation condition corresponding to the index value is determined. The radical irradiation time is determined such that the product of the read index value of radical density and radical irradiation time is equal to the product of the index value of radical density and the radical irradiation time input by the user.

When the radical irradiation condition is determined, a sample component to be analyzed is introduced to the ion source 1, and measurement is performed in the same manner as described above. Since the measurement procedure is the same as described above, the description thereof will be omitted.

Conventionally, in order to reproduce the measurement result obtained by another mass spectrometer, various radical irradiation conditions need to be changed to determine the radical irradiation condition having an appropriate density. In contrast, by using the mass spectrometer of the embodiment, the radical irradiation condition can easily be determined by simply inputting the radical temperature. Even the radical supply unit 6 of the same type does not have completely the same radical generation success rate, and in addition, the radical generation success rate changes as the use of the unit is continued. In such a case as well, by using the ion analyzer of the embodiment, the index value of radical density at the time point at the radical supply unit can be obtained.

Second Embodiment

Figure 4:
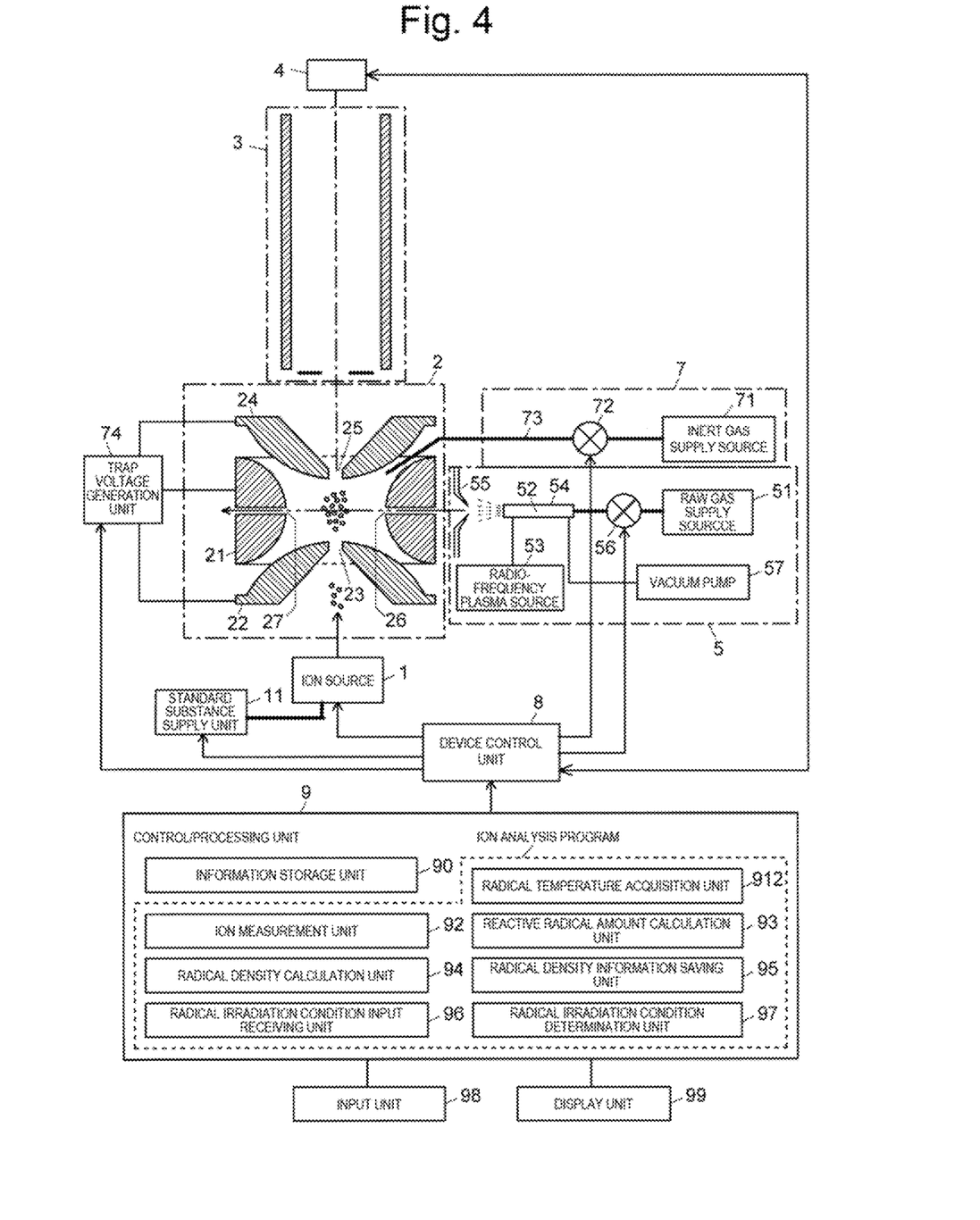
FIG. 4 is a schematic configuration diagram of an ion trap-time-of-flight mass spectrometer of a second embodiment that is another embodiment of the ion analyzer according to the present invention.
Figure 5:
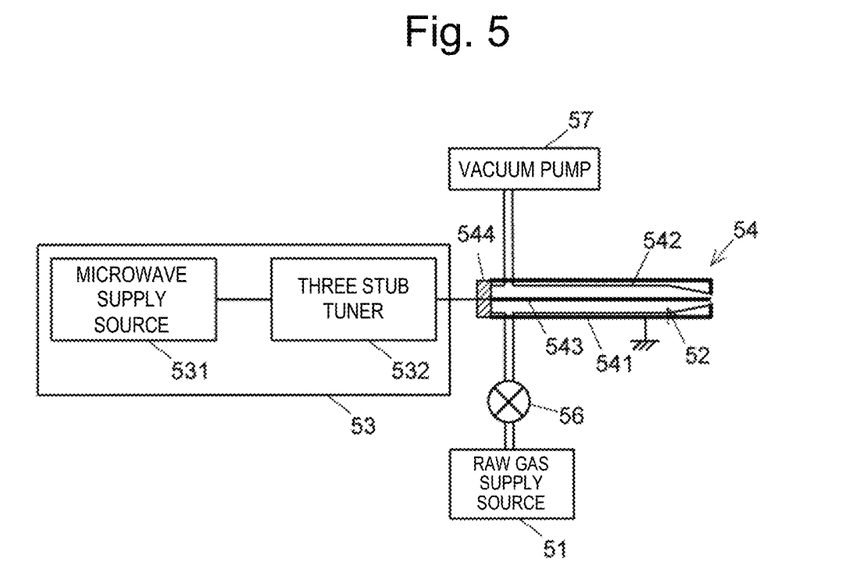
FIG. 5 is a schematic configuration diagram of a radical irradiation unit used in the ion trap-time-of-flight mass spectrometer of the second embodiment.

Next, a mass spectrometer of the second embodiment will be described. FIG. 4 shows a schematic configuration of the mass spectrometer of the second embodiment, and FIG. 4 shows a schematic configuration of a radical supply unit 5 which is a part of the mass spectrometer. Since the difference in configuration from the mass spectrometer of the first embodiment is only the radical supply unit 5, and the main difference in analysis operation is in the radical supply unit 5 and a radical temperature acquisition unit 912, these will be mainly described below, and the same configurations as those of the mass spectrometer of the first embodiment will be denoted by the same reference numerals and description thereof will be omitted.

The radical supply unit 5 mainly includes a raw gas supply source 51, a radio-frequency plasma source 53, and a nozzle 54. The radio-frequency plasma source 53 is an inductively coupled plasma source, and includes a microwave supply source 531 and a three stub tuner 532. The nozzle 54 includes a ground electrode 541 constituting an outer peripheral portion and a torch 542 located inside the ground electrode 541, and the inside of the torch 542 serves as a radical generation chamber 52. As the torch 542, one made of a dielectric is used. For example, a torch 542 made of Pyrex (registered trademark) glass can be suitably used.

Inside the radical generation chamber 52, a needle electrode 543 connected to the radio-frequency plasma source 53 via a connector 544 penetrates in the longitudinal direction of the radical generation chamber 52. A flow path for supplying the raw gas from the raw gas supply source 51 to the radical generation chamber 52 is provided, and a valve 56 for adjusting the flow rate of the raw gas is provided on the flow path.

Second Analysis Example

The difference between the measurement procedure in the mass spectrometer of the second embodiment and the measurement procedure in the mass spectrometer of the first embodiment is in the operations of the radical supply unit 5 and the radical temperature acquisition unit 912, and the other procedures are the same as those of the first embodiment. Therefore, these operations will be mainly described.

In the mass spectrometer of the first embodiment, radicals are generated from the raw gas by thermal dissociation in the radical supply unit 5. In the mass spectrometer of the second embodiment, radicals are generated from the raw gas by vacuum discharge in the radical supply unit 6.

Specifically, after the precursor ions are converged to the vicinity of the center of the ion trap 2, the valve 56 is opened, and microwaves are supplied from the radio-frequency plasma source 53 to the radical generation chamber 52. By thus generating vacuum discharge in the radical generation chamber 52, radicals are generated from the raw gas. The gas containing the generated radicals is ejected from the nozzle 54, and the radicals having passed through an opening of the skimmer 55 become a beam having a small diameter and pass through the radical introduction port 26, are supplied into the ion trap 2, and the precursor ions trapped in the ion trap 2 are irradiated with the radicals.

In the mass spectrometer of the first embodiment, the radical temperature acquisition unit 911 operates the temperature measurement unit 65 to measure the temperature of the capillary 62, thereby acquiring information on the radical temperature. In the mass spectrometer of the second embodiment, the radical temperature acquisition unit 912 measures the detection intensity of predetermined product ions derived from a plurality of standard substances by the ion measurement unit 92, and acquires information on the radical temperature as follows.

Using the first to fourth formulas described in the first embodiment, the ratio k(T) of the number of radical attachment to a standard substance A and a standard substance B under the same radical irradiation condition is expressed by the following formula.

[Fifth formula]

$$k(T) = \frac{\sigma_B R_B}{\sigma_A R_A} = \frac{\sigma_B F(E_B, T)}{\sigma_A F(E_A, T)} \tag{5}$$

$E_A$ and $E_B$ are magnitudes of the activation energy of the radical attachment reaction related to the two standard substances A and B, and both are known. $\sigma_A$ and $\sigma_B$ are collision cross-sectional areas for radical attachment of the standard substances A and B, which are determined by the molecule structures of the standard substances A and B, and do not depend on the temperature and amount of the radicals. Therefore, the value of $\sigma_B/\sigma_A$ can also be estimated from numerical simulation, model calculation, or the like. Furthermore, as described in the first analysis example, the approximate solution of F(E, T) can be calculated by a numerical solution. Therefore, the radical temperature T can be estimated from the measured value of k(T).

After the radical temperature T is estimated by the radical temperature acquisition unit 912, the index value of radical density can be obtained in the same manner as in the first analysis example. In the mass spectrometer of the first embodiment, the index value of radical density can also be obtained by measurement using a plurality of standard substances instead of using the temperature measurement unit 65.

A specific example of estimating the radical temperature T from the two standard substances A and B will be described. The measurement example used in the description is a result of using RCL and fullerene as the standard substances in the mass spectrometer of the first embodiment. The radical temperature T can be estimated in the mass spectrometer of the second embodiment as well by performing the same measurement. The activation energy for the radical attachment reaction of fullerene is 0 kJ/mol.

Figure 6:
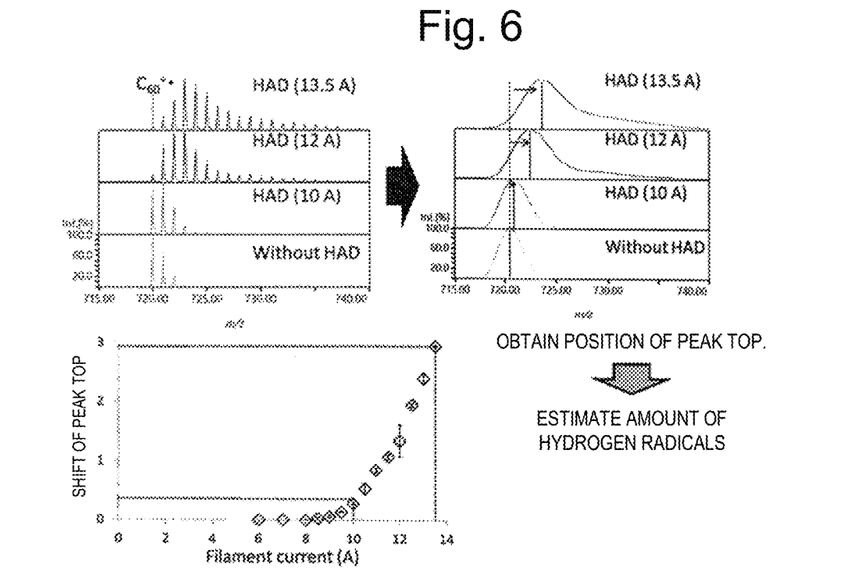
FIG. 6 is a view for explaining a result of irradiating RCL with hydrogen radicals generated under a plurality of radical irradiation conditions in the mass spectrometer in a second analysis example.
Figure 7:
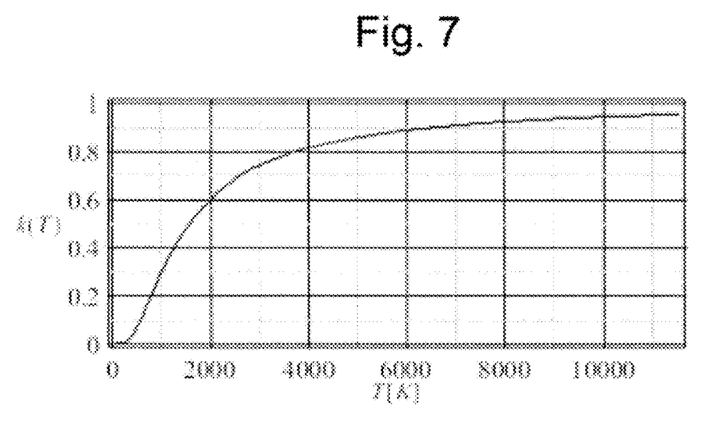
FIG. 7 is a chart illustrating relationship between a radical temperature of hydrogen radicals and a ratio of an amount of radicals related to RCL to an amount of reactive radicals related to fullerene in the mass spectrometer in the second analysis example.

FIG. 6 is a measurement result of product ions (hydrogen adduct ions) generated by attaching hydrogen radicals to fullerene under a plurality of radical irradiation conditions in the same manner as in the RCL measurement in the first analysis example. The upper left figure in FIG. 6 represents product ion spectrums obtained by the measurement, and the upper right figure represents the entire product ion spectrum as one peak to obtain the shift amount of the peak top, FIG. 7 is a graph illustrating the relationship between the radical temperature T and the ratio k(T) of the amount of reactive radicals calculated by a numerical solution method using the above described formulas for fullerene ($E_A$=0 kJ/mol) and RCL ($E_B$=11 kJ/mol). In the result of HAD (10 A) for RCL illustrated in FIG. 3, hydrogen is attached to about 10% of precursor ions. In the result of HAD (10 A) for fullerene illustrated in FIG. 6, hydrogen is attached to about 50% of precursor ions. From these ratios, k(T)=0.2 is obtained. From this ratio value and the graph in FIG. 7, it is found that the radical temperature of the hydrogen radicals is 800 K.

As described above, in the mass spectrometers according to the first and second embodiments, the index value of radical density supplied from the radical supply units 5 and 6 to the ion trap 2 can be calculated. Therefore, for example, it is possible to clarify the conditions of the radicals at the time of creating a product ion spectrum to be stored in a library. When an unknown sample is analyzed, the unknown sample is placed in the same ion trap 2, and target radicals are supplied to the ion trap 2 from the radical supply units 5 and 6 in the same manner to generate product ions of sample components to be analyzed, and the product ion spectrum of the sample is measured. As a result, the product ion spectrum measured for the sample component and the product ion spectrum stored in the library are generated by the radicals under the same conditions (density), both can be correctly compared, and the target compound can be correctly identified.

The first and second embodiments and the first and second analysis examples described above are all examples, and can suitably be altered according to the spirit of the present invention.

In the first and second analysis examples, the case where the density (index value) of hydrogen radicals is determined in the case of performing analysis using hydrogen radicals has been described. The present invention is also applicable to analysis using other kinds of radicals such as hydroxy radicals, oxygen radicals, and nitrogen radicals. When water vapor is used as the raw gas, hydroxyl radicals, oxygen radicals, and hydrogen radicals are generated. When air is used, oxygen radicals and nitrogen radicals are mainly generated. When oxygen gas is used, oxygen radicals are generated. When nitrogen gas is used, nitrogen radicals are generated. By irradiating precursor ions derived from a peptide with hydrogen radicals, product ions of c/z-type are generated. By irradiating precursor ions derived from a peptide with hydroxyl radicals, oxygen radicals, or nitrogen radicals, product ions of a/x-type and/or b/y-type can be generated.

In addition, as described in the previous application by the inventor (PCT/JP2018/043074), the present invention can also be applied to a case where precursor ions derived from a sample component containing a hydrocarbon chain is irradiated with radicals having oxidizing ability such as hydroxy radicals and oxygen radicals. In this case, dissociation specifically occurs at the position of an unsaturated bond contained in the hydrocarbon chain, and the structure of the hydrocarbon chain can be estimated from the product ions generated by the dissociation. In addition, the present invention can also be applied to a case where product ions in which an oxygen atom is added at an unsaturated bond contained in the hydrocarbon chain is generated to estimate whether the structure of the unsaturated bond of the hydrocarbon is a cis type or a trans type.

Furthermore, as described in the previous application mentioned above, the present invention can also be applied to the case of irradiating precursor ions derived from a sample component containing a hydrocarbon chain with radicals having reducing ability such as nitrogen radicals. In this case, by causing dissociation to occur specifically at a carbon-carbon bond contained in the hydrocarbon chain regardless of whether the bond is a saturated bond or an unsaturated bond, the structure of the hydrocarbon chain can be estimated.

In the above first analysis example, the temperature of the radicals is estimated by measuring the temperature of the capillary 62 by the infrared radiometer of the temperature measurement unit 65. The method of estimating the radical temperature is not limited to this, and the radical temperature may be estimated by an appropriate method according to the configuration of the device or the like.

In the above second analysis example, two kinds of substances, that is, fullerene having an activation energy of radical addition reaction of 0 J/mol (energy threshold $E_A$=0 kJ/mop and RCL having an activation energy of 11 kJ/mol (energy threshold $E_B$=11 kJ/mol), are used as standard substances. However, other standard substances that have known activation energies of radical attachment reaction and have different magnitudes of the activation energies from each other can also be used in combination. By using three or more kinds of standard substances, the accuracy of calculating the radical temperature can be further raised. Furthermore, in the above analysis examples, product ions are obtained by adding radicals to precursor ions, and the amount of radicals that caused the radical attachment reaction is obtained from the amount of the product ions. However, the amount of radicals that caused the radical attachment reaction can be obtained from the measured amount of fragment ions generated by dissociation of the precursor ions caused by the radical attachment reaction.

The ion trap-time-of-flight mass spectrometer equipped with a three-dimensional ion trap is used in the first embodiment and the second embodiment described above. A linear ion trap or collision cell may be used in place of the three-dimensional ion trap, and it can be configured that irradiation with radicals is performed at the tuning when the precursor ions are introduced into the linear ion trap or collision cell. The time-of-flight mass separation unit is a linear type in the first embodiment and the second embodiment described above. A time-of-flight mass separation unit of a reflectron type or a multi-turn type may be used. Other than the time-of-flight mass separation unit, for example, other types of mass separation unit such as the one that performs mass separation using the ion separation function of the ion trap 2 itself or an orbitrap may be used. The radical supply unit described in the embodiments described above can suitably be used not only in a mass spectrometer but also in an ion mobility analyzer. A radio-frequency plasma source is used in the second embodiment. A hollow cathode plasma source can also be used instead of the radio-frequency plasma source. Alternatively, radicals may be generated in an atmospheric pressure atmosphere.

Aspects

Those skilled in the art understand that the plurality of illustrative embodiments described above are specific examples of the aspect below.

(First item) An ion analyzer according to an aspect is an ion analyzer for analyzing product ions generated by irradiating precursor ions derived from a sample component with radicals, the ion analyzer including:
a reaction chamber;
a radical supply unit configured to generate the radicals and supply the radicals to the reaction chamber;
a radical temperature acquisition unit configured to acquire a temperature of the radicals to be supplied to the reaction chamber from the radical supply unit;
a standard substance supply unit configured to supply a predetermined amount of predetermined precursor ions to the reaction chamber, the predetermined precursor ions being generated from a standard substance whose activation energy of a reaction in which the radicals attach to the standard substance is known;
an ion measurement unit configured to measure an amount of predetermined product ions generated from the precursor ions derived from the standard substance by the reaction with the radicals;
a reactive radical amount calculation unit configured to obtain, based on the amount of the predetermined product ions measured, an amount of reactive radicals that are radicals having an energy equal to or more than the activation energy among the radicals supplied to the reaction chamber; and
a radical density calculation unit configured to obtain a radical density based on the temperature of the radicals, the activation energy, and the amount of the reactive radicals.

In the ion analyzer according to the first item, since the radical density supplied from the radical supply unit to the reaction chamber is calculated, for example, radical irradiation conditions at the time of creating a product ion spectrum stored in a library can be clarified. When an unknown sample is analyzed, the unknown sample is placed in the same reaction chamber, target radicals are supplied thereto from the radical supply unit by the same method to generate product ions derived from a sample component to be analyzed, and a product ion spectrum thereof is measured, whereby a product ion spectrum irradiated with radicals under the same conditions (density) as those of the product ion spectrum stored in the library is acquired, and the sample component can be correctly identified.

(Second item) In the ion analyzer according to the first item,
the radical supply unit may include a raw gas supply source and a thermal dissociation unit configured to thermally dissociate a raw gas supplied from the raw gas supply source, and
the radical temperature acquisition unit may be configured to acquire a temperature of radicals by measuring a temperature of the thermal dissociation unit.

According to the ion analyzer of the second item, the radical temperature can be easily acquired by measuring the temperature of the thermal dissociation unit.

(Third item) In the ion analyzer according to the first or second item,
the ion measurement unit may be configured to measure an amount of predetermined product ions for each of a plurality of standard substances having different activation energies,
the reactive radical amount calculation unit may be configured to obtain an amount of reactive radicals for each of the plurality of standard substances, and
the radical temperature acquisition unit may be configured to acquire a temperature of radicals based on a ratio of a number of reactive radicals of the standard substance.

According to the ion analyzer of the third item, the temperature of the radical can be acquired without using a physical temperature measuring device or the like.

(Fourth item) In the ion analyzer according to any one of the first to third items, the product ions measured by the ion measurement unit may be radical adduct ions obtained by adding radicals to the precursor ions.

In the ion analyzer according to the fourth item, the radical adduct ions are measured to obtain the amount of reactive radicals. Precursor ions may be dissociated to generate fragment ions in the radical addition reaction. In such a case, a plurality of ions are generated from a single radical. Since the amount of radical adduct ions is the same as the amount of radicals, the amount of reactive radicals can be obtained more easily and accurately.

(Fifth item) In the ion analyzer according to any one of the first to fourth items, the radicals may be hydrogen radicals, oxygen radicals, or nitrogen radicals.

In the ion analyzer according to the fifth item, the radical temperature of a kind of radicals appropriate for the characteristics of a sample component (for example, a compound containing a peptide or a hydrocarbon chain) and the purpose of analysis can be obtained.

(Sixth item) The ion analyzer according to any one of the first to fifth items may further include:
an information storage unit;
a radical irradiation condition input receiving unit configured to receive an input of a radical irradiation condition for the radical supply unit; and
a radical density information saving unit configured to save radical density information in which the radical irradiation condition and a radical density are associated with each other in the information storage unit.

In the ion analyzer according to item 6, radical temperature information in which a radical irradiation condition and a density of radicals with which precursor ions are irradiated under the radical irradiation condition are associated with each other is obtained. A database of radical temperature information can be constructed by accumulating the radical temperature information in an information storage unit or the like.

(Seventh item) In the ion analyzer according to the sixth item may further include:
- a radical irradiation condition input receiving unit configured to receive an input of radical density of radicals with which the precursor ions are irradiated; and
- a radical irradiation condition determination unit configured to determine, based on the radical density information, a condition under which irradiation with radicals having the radical density which has been input is performed.

In the ion analyzer according to the seventh item, by simply inputting the radical density, the radical irradiation condition for irradiating the precursor ions with radicals having the radical density can easily be determined.

(Eighth item) The ion analyzer according to the sixth item may further include:
- a radical irradiation condition input receiving unit configured to receive an input of radical density of radicals with which the precursor ions are irradiated and an irradiation time; and
- a radical irradiation condition determination unit configured to determine, based on the radical density information, a radical irradiation condition and an irradiation time so that a product of the radical irradiation condition and the irradiation time matches to a product of the radical density and the irradiation time which have been input.

In the ion analyzer according to the eighth item, the radical density is saved as a discrete value in the radical density information, and even when the radical irradiation condition that matches the input radical density is not saved, the radical irradiation condition and the irradiation time that can irradiate the same amount of radicals as the radicals irradiated to the precursor ions with the input radical density and irradiation time can be easily determined.

REFERENCE SIGNS LIST

1 . . . Ion Source
11 . . . Standard Substance Supply Unit
2 . . . Ion Trap
21 . . . Ring Electrode
22 . . . Inlet-Side End Cap Electrode
23 . . . Ion Introduction Hole
24 . . . Outlet-Side End Cap Electrode
25 . . . Ion Ejection Hole
26 . . . Radical Introduction Port
27 . . . Radical Discharge Port
3 . . . Time-of-Flight Mass Separation Unit
4 . . . Ion Detector
5, 6 . . . Radical Supply Unit
51, 61 . . . Raw Gas Supply Source
52 . . . Radical Generation Chamber
53 . . . Radio-Frequency Plasma Source
531 . . . Microwave Supply Source
532 . . . Three Stub Tuner
54 . . . Nozzle
541 . . . Ground Electrode
542 . . . Torch
543 . . . Needle Electrode
544 . . . Connector
55, 66 . . . Skimmer
56, 64 . . . Valve
62 . . . Capillary
63 . . . Heating Unit
65 . . . Temperature Measurement Unit
7 . . . Inert Gas Supply Unit
71 . . . Inert Gas Supply Source
72 . . . Valve
73 . . . Gas Inlet Pipe
74 . . . Trap Voltage Generation Unit
8 . . . Device Control Unit
9 . . . Control/Processing Unit
90 . . . Information Storage Unit
911, 912 . . . Radical Temperature Acquisition Unit
92 . . . Ion Measurement Unit
93 . . . Reactive Radical Amount Calculation Unit
94 . . . Radical Density Calculation Unit
95 . . . Radical Density Information Saving Unit
96 . . . Radical Irradiation Condition Input Receiving Unit
97 . . . Radical Irradiation Condition Determination Unit
98 . . . Input Unit
99 . . . Display Unit

The invention claimed is:

1. An ion analyzer for analyzing product ions generated by irradiating precursor ions derived from a sample component with radicals, the ion analyzer comprising:
- a reaction chamber;
- a radical supply unit configured to generate the radicals and supply the radicals to the reaction chamber;
- a radical temperature acquisition unit configured to acquire a temperature of the radicals to be supplied to the reaction chamber from the radical supply unit;
- a standard substance supply unit configured to supply a predetermined amount of predetermined precursor ions to the reaction chamber, the predetermined precursor ions being generated from a standard substance whose activation energy of a reaction in which the radicals attach to the standard substance is known;
- an ion measurement unit configured to measure an amount of predetermined product ions generated from the precursor ions derived from the standard substance by the reaction with the radicals;
- a reactive radical amount calculation unit configured to obtain, based on the amount of the predetermined product ions measured, an amount of reactive radicals that are radicals having an energy equal to or more than the activation energy among the radicals supplied to the reaction chamber; and
- a radical density calculation unit configured to obtain a radical density based on the temperature of the radicals, the activation energy, and the amount of the reactive radicals.

2. The ion analyzer according to claim 1, wherein
the radical supply unit includes a raw gas supply source and a thermal dissociation unit configured to thermally dissociate a raw gas supplied from the raw gas supply source, and
the radical temperature acquisition unit is configured to acquire a temperature of radicals by measuring a temperature of the thermal dissociation unit.

3. The ion analyzer according to claim 1, wherein
the ion measurement unit is configured to measure an amount of predetermined product ions for each of a plurality of standard substances having different activation energies,
the reactive radical amount calculation unit is configured to obtain an amount of reactive radicals for each of the plurality of standard substances, and
the radical temperature acquisition unit is configured to acquire a temperature of radicals based on a ratio of a number of reactive radicals of the standard substance.

4. The ion analyzer according to claim 1, wherein the product ions measured by the ion measurement unit are radical adduct ions obtained by adding radicals to the precursor ions.

5. The ion analyzer according to claim 1, wherein the radicals are hydrogen radicals, oxygen radicals, or nitrogen radicals.

6. The ion analyzer according to claim 1, further comprising:
- an information storage unit;
- a radical irradiation condition input receiving unit configured to receive an input of a radical irradiation condition for the radical supply unit; and
- a radical density information saving unit configured to save radical density information in which the radical irradiation condition and a radical density are associated with each other in the information storage unit.

7. The ion analyzer according to claim 6, further comprising:
- a radical irradiation condition input receiving unit configured to receive an input of radical density of radicals with which the precursor ions are irradiated; and
- a radical irradiation condition determination unit configured to determine, based on the radical density information, a condition under which irradiation with radicals having the radical density which has been input is performed.

8. The ion analyzer according to claim 6, further comprising:
- a radical irradiation condition input receiving unit configured to receive an input of radical density of radicals with which the precursor ions are irradiated and an irradiation time; and
- a radical irradiation condition determination unit configured to determine, based on the radical density information, a radical irradiation condition and an irradiation time so that a product of the radical irradiation condition and the irradiation time matches to a product of the radical density and the irradiation time which have been input.

* * * * *